(12) United States Patent
Nagaoka et al.

(10) Patent No.: US 7,324,828 B2
(45) Date of Patent: Jan. 29, 2008

(54) TRANSMISSION POWER CONTROL METHOD AND DEVICE

(75) Inventors: Hiroaki Nagaoka, Saitama (JP); Katsutoshi Itoh, Tokyo (JP); Noboru Oki, Saitama (JP); Taku Nagase, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 78 days.

(21) Appl. No.: 10/555,045

(22) PCT Filed: Feb. 17, 2005

(86) PCT No.: PCT/JP2005/002967

§ 371 (c)(1),
(2), (4) Date: Oct. 28, 2005

(87) PCT Pub. No.: WO2005/083908

PCT Pub. Date: Sep. 9, 2005

(65) Prior Publication Data

US 2006/0217088 A1    Sep. 28, 2006

(30) Foreign Application Priority Data

Mar. 1, 2004  (JP) .............................. 2004-056630

(51) Int. Cl.
*H04B 7/00*  (2006.01)

(52) U.S. Cl. .......................... 455/522; 455/68; 455/69; 455/70; 455/67.11

(58) Field of Classification Search ................ 455/522, 455/68, 69, 70, 67.11; 375/130, 260, 285, 375/343, 367, 146; 370/203

See application file for complete search history.

(56) References Cited

U.S. PATENT DOCUMENTS 6,833,770 B1 * 12/2004  Fukumoto et al. .......... 332/103
6,850,771 B2 *  2/2005  Malladi et al. .............. 455/522

(Continued)

FOREIGN PATENT DOCUMENTS

JP  10-41919  2/1998

(Continued)

*Primary Examiner*—Nay Maung
*Assistant Examiner*—Dominic E. Rego
(74) *Attorney, Agent, or Firm*—Frommer Lawrence & Haug LLP; William S. Frommer; Thomas F. Presson

(57) ABSTRACT

Disclosed is a method and an apparatus for controlling transmission electric power capable of minimizing a decrease in the amount of maximum transmission electric power without degrading an adjacent channel leakage power ratio when code-multiplexing additional control information with data and main control information. A mobile device checks values of gain factors βd and βc when performing code multiplexing to transmit signals from channels DPDCH to transmit data, DPCCH to transmit main control information, and HS-DPCCH to transmit additional control information. A maximum transmission electric power is decreased at a plurality of levels based on the check result and a ratio (Δhs) between the gain factors βc and βhs. It may be preferable to check the presence or absence of transmission data instead of the gain factor βd. In this case, when no transmission data is available, the maximum transmission electric power is decreased at a plurality of levels based on Δhs. When transmission data is available, the maximum transmission electric power is decreased at a plurality of levels based on the gain factor βc and Δhs.

13 Claims, 10 Drawing Sheets

U.S. PATENT DOCUMENTS

| | | | |
|---|---|---|---|
| 7,003,269 B2* | 2/2006 | Willenegger | 455/102 |
| 7,023,897 B2* | 4/2006 | Kurihara | 375/130 |
| 2002/0021744 A1* | 2/2002 | Iida | 375/130 |
| 2004/0085936 A1* | 5/2004 | Gopalakrishnan et al. | 370/335 |
| 2004/0109492 A1* | 6/2004 | Viero et al. | 375/130 |
| 2005/0025100 A1* | 2/2005 | Lee et al. | 370/335 |
| 2005/0068921 A1* | 3/2005 | Liu | 370/335 |
| 2005/0068990 A1* | 3/2005 | Liu | 370/516 |
| 2005/0186981 A1* | 8/2005 | Nishio | 455/522 |
| 2005/0277419 A1* | 12/2005 | Takano et al. | 455/442 |

FOREIGN PATENT DOCUMENTS

| | | |
|---|---|---|
| JP | 11-154927 | 6/1999 |
| JP | 11-234733 | 8/1999 |
| JP | 2000-138655 | 5/2000 |
| JP | 2001-136152 | 5/2001 |
| JP | 2003-188817 | 7/2003 |
| JP | 2003-298509 | 10/2003 |
| JP | 2003-304195 | 10/2003 |
| JP | 2004-349941 | 12/2004 |

* cited by examiner

FIG.6

| Signaling values for βc and βd | Quantized amplitude ratios βc and βd |
|---|---|
| 15 | 1.0 |
| 14 | 14/15 |
| 13 | 13/15 |
| 12 | 12/15 |
| 11 | 11/15 |
| 10 | 10/15 |
| 9 | 9/15 |
| 8 | 8/15 |
| 7 | 7/15 |
| 6 | 6/15 |
| 5 | 5/15 |
| 4 | 4/15 |
| 3 | 3/15 |
| 2 | 2/15 |
| 1 | 1/15 |
| 0 | SWITCH DISABLED |

FIG. 7

| Signaling values for $\triangle$ack, $\triangle$nack and $\triangle$cqi | $\triangle$hs |
|---|---|
| 8 | 30/15 |
| 7 | 24/15 |
| 6 | 19/15 |
| 5 | 15/15 |
| 4 | 12/15 |
| 3 | 9/15 |
| 2 | 8/15 |
| 1 | 6/15 |
| 0 | 5/15 |

TRANSMISSION POWER CONTROL METHOD AND DEVICE

TECHNICAL FIELD

The present invention relates to a method and an apparatus for controlling transmission electric power in a radio communication system so as to control maximum transmission electric power when a mobile device transmits a plurality of signals in a code-multiplexing fashion.

BACKGROUND ART

In recent years, the mobile communication field provides the system that multiplexes channels for transmitting different pieces of information at the same time and uses a radio line for transmission. An example of such system includes the W-CDMA system that is under discussion of 3GPP (Third Generation Partnership Project). The 3GPP specification additionally defines HSDPA (High Speed Downlink Packet Access) as a method of improving a rate of transmitting data from a base station to a mobile device (downlink). The HSDPA technology transmits reception quality information monitored on a mobile device and a reception determination result concerning reception data to the base station. This implements a downlink high-speed data transmission service that enables the adaptive modulation, the adaptive code rate, and the retransmission synthesis. To transmit the reception quality information and the reception determination result about reception data to the base station, a channel called HS-DPCCH (Dedicated Physical Control Channel for HS-DSCH) is transmitted in a code-multiplexing fashion with the conventional W-CDMA uplink. This code multiplexing increases a PAPR (Peak to Average Power Ratio), i.e., a ratio of transmission signal's peak power to average power, and degrades an ACLR (Adjacent Channel Leakage power Ratio). To improve the ACLR, it is necessary to improve linearity of a PA (Power Amplifier), increase the PA size, add a distortion compensation circuit, and the like (e.g., see JP-A No. 142959/2003). However, for example, this causes problems of increasing the power consumption and the circuit scale.

When the HS-DPCCH is currently available, a possible solution is to decrease the maximum transmission electric power at a fixed rate. However, decreasing the maximum transmission electric power inevitably limits the scope of HSDPA services. It is desirable to appropriately decrease the maximum transmission electric power depending on situations, not uniformly.

The present invention has been made in consideration of the foregoing. It is therefore an object of the present invention to provide a method and an apparatus for controlling transmission electric power capable of minimizing a decrease in the amount of maximum transmission electric power without degrading an adjacent channel leakage power ratio when code-multiplexing additional control information with data and main control information.

DISCLOSURE OF THE INVENTION

The present invention provides a transmission electric power control method of controlling a maximum transmission electric power during transmission of a plurality of signals in a code-multiplexing fashion, wherein, when code multiplexing is used to transmit signals from a first transmission channel to transmit data, a second transmission channel to transmit main control information, and a third transmission channel to transmit additional control information and when first, second, and third gain factors are used to weight signals from the first, second, and third transmission channels, a maximum transmission electric power is decreased at a plurality of levels based on a ratio between the first and second gain factors and a ratio between the second and third gain factors.

The present invention decreases a maximum transmission electric power at a plurality of levels based on the first and second gain factors and a ratio between the second and third gain factors. This differs from a method of decreasing the maximum transmission electric power at a fixed rate during transmission of additional control information for the third transmission channel. That is, situations are segmented based on the first and second gain factors and a ratio between the second and third gain factors. It is possible to settle appropriate backoff amounts of the maximum transmission electric power at a plurality of levels according to the segmented situations.

More specifically, the backoff amount of maximum transmission electric power is decreased as a ratio of said second gain factor to the first gain factor decreases. Further, the backoff amount of maximum transmission electric power is decreased as a ratio of said third gain factor to the second gain factor decreases.

The maximum transmission electric power can be decreased under control of an automatic gain control circuit disposed previously to a power amplifier.

The present invention provides another transmission electric power control method of controlling a maximum transmission electric power during transmission of a plurality of signals in a code-multiplexing fashion, wherein code multiplexing is used to transmit signals from a first transmission channel to transmit data, a second transmission channel to transmit main control information, and a third transmission channel to transmit additional control information, the method comprising the steps of: checking whether or not transmission data is available; when no transmission data is available, using first, second, and third gain factors to weight signals from the first, second, and third transmission channels and decreasing a maximum transmission electric power at a plurality of levels based on a ratio between the second and third gain factors; and when transmission data is available, decreasing a maximum transmission electric power at a plurality of levels based on the second gain factor and a ratio between the second and third gain factors.

The present invention decreases a maximum transmission electric power at a plurality of levels based on the presence or absence of transmission data, the second gain factor, and a ratio between the second and third gain factors. This differs from a method of decreasing the maximum transmission electric power at a fixed rate during transmission of additional control information for the third transmission channel. That is, situations are segmented based on the presence or absence of transmission data, the second gain factor, and a ratio between the second and third gain factors. It is possible to settle appropriate backoff amounts of the maximum transmission electric power at a plurality of levels according to the segmented situations. This solves the problem of excessively decreasing the maximum transmission electric power and narrowing a scope of available services. According to the present invention, checking the presence or absence of transmission data eliminates the need to independently calculate the first gain factor.

More specifically, a backoff amount for unavailability of transmission data is configured to be larger than that for availability of transmission data. The backoff amount of maximum transmission electric power is decreased as a ratio of the third gain factor to the second gain factor decreases.

The present invention provides another yet another transmission electric power control method of controlling a maximum transmission electric power during transmission of a plurality of signals in a code-multiplexing fashion, wherein code multiplexing is used to transmit signals from a first transmission channel to transmit data, a second transmission channel to transmit main control information, and a third transmission channel to transmit additional control information, the method comprising the steps of: checking a requested transmission electric power; and when a requested transmission electric power is greater than or equal to a threshold value close to a maximum transmission electric power, clipping a transmission signal using a base band at a plurality of levels in accordance with magnitude of a requested transmission electric power. The present invention provides clipping at a plurality of levels according to the magnitude of requested transmission electric power. This differs from a method of constantly performing unchangeable clipping from a requested transmission electric power. Preferably, according to the present invention, first, second, and third gain factors are used to weight signals from the first, second, and third transmission channels. Values of the first, second, and third gain factors are converted so as to normalize an output power value for a transmission signal of the base band.

In addition, the present invention provides a transmission electric power control apparatus to implement the above-mentioned transmission electric power control methods. Its configurations, operations, and effects will be described in the embodiments below in detail.

The method and the apparatus for controlling transmission electric power according to the present invention can segment a situation based on the presence or absence of transmission data, gain factors, and the like. An appropriate backoff amount of maximum transmission electric power can be settled for each of the segmented situations at a plurality of levels. When additional control information is code-multiplexed to data and main control information, the backoff amount of maximum transmission electric power can be minimized without degrading the adjacent channel leakage power ratio. Accordingly, it is possible to effectively prevent the adjacent channel leakage power ratio from degrading and enlarge the scope of available services.

Another aspect of the method and the apparatus for controlling transmission electric power according to the present invention can clip a transmission signal using the base band at a plurality of levels in accordance with the magnitude of a requested transmission electric power. When additional control information is code-multiplexed to data and main control information, it is possible to prevent the adjacent channel leakage power ratio from degrading without decreasing the maximum transmission electric power.

BRIEF DESCRIPTION OF DRAWINGS

FIG. 6 is a data table showing the relationship between control values concerning gain factors βc and βd according to the embodiment of the present invention and ratios between both gain factors;

FIG. 7 is a data table showing the relationship between control values concerning reception quality information and reception determination results of reception data according to the embodiment of the present invention and parameter Δhs;

BEST MODE FOR CARRYING OUT THE INVENTION

Embodiments of the present invention will be described in further detail with reference to the accompanying drawings.

A first embodiment of the present invention concerns a method and an apparatus for adaptively decreasing the maximum transmission electric power satisfying the 3GPP's ACLR specifications during HSDPA implementation according to the W-CDMA system.

Figure 10:
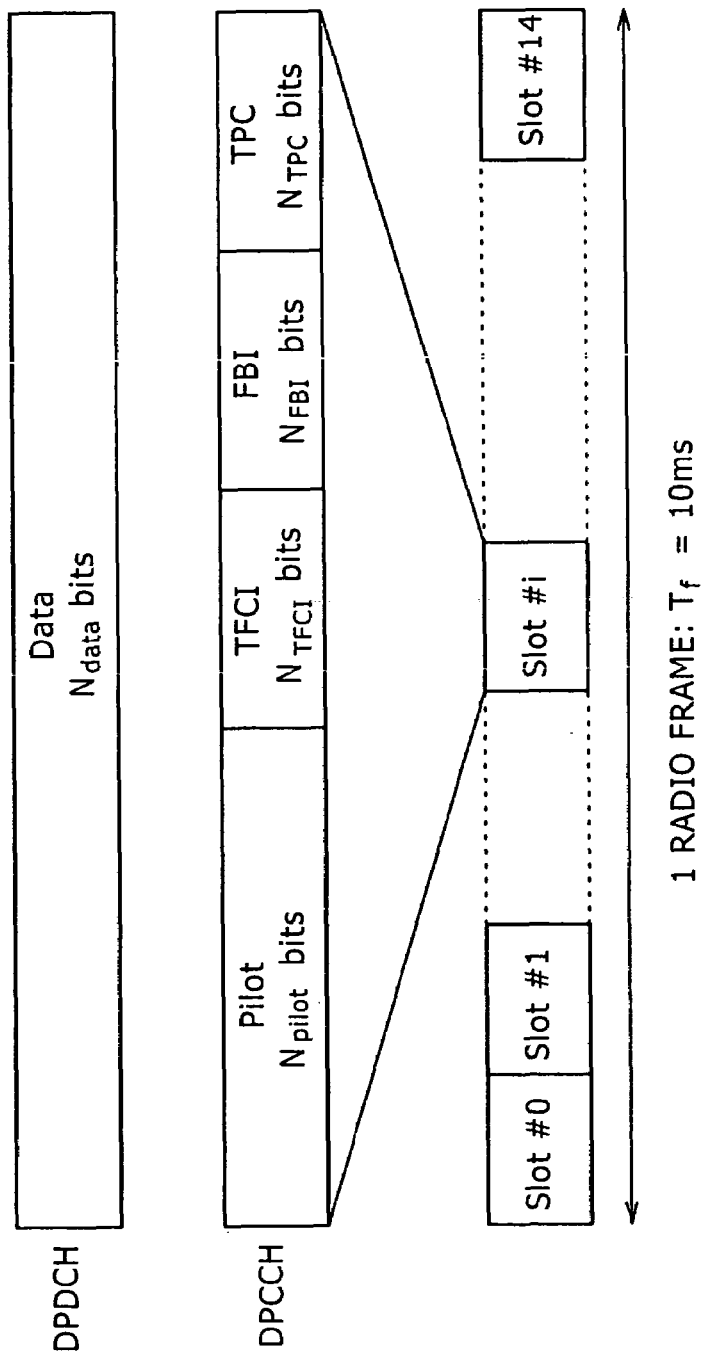
FIG. 10 shows the frame configuration of uplink DPCH.

FIG. 10 shows the frame configuration of an uplink DPCH (Dedicated Physical CHannel). One radio frame (10 ms) is a reference unit of decoding and is composed of 15 time slots. Each slot is provided with a DPDCH (Dedicated Physical Data Channel) to transmit user information (data signal) and a DPCCH (Dedicated Physical Control CHannel) to transmit control information. The DPDCH is a channel used to transmit data generated in a high-order layer. There are three cases of one DPDCH, a plurality of DPDCH, and no DPDCH. The DPCCH is a channel to transmit control information for the physical layer. At least one DPCCH is always available in any modes. The control information contains a pilot bit as a known pattern to be used for channel estimation in the synchronous detection, a transmission electric power control command (TPC), feedback information (FBI), and a transport format combination indicator (TFCI). The FBI contains information to be transmitted to the base station from a terminal for controlling various diversities. The TFCI provides information indicating how many transport channels are multiplexed in a reception frame of the uplink DPDCH and which transport format each transport channel uses. As mentioned above, the channel HS-DPCCH (Dedicated Physical Control Channel for HS-DSCH) is code-multiplexed on a conventional W-CDMA uplink for transmission so as to transmit the reception quality information and the reception determination result of reception data to the base station.

Figure 1:
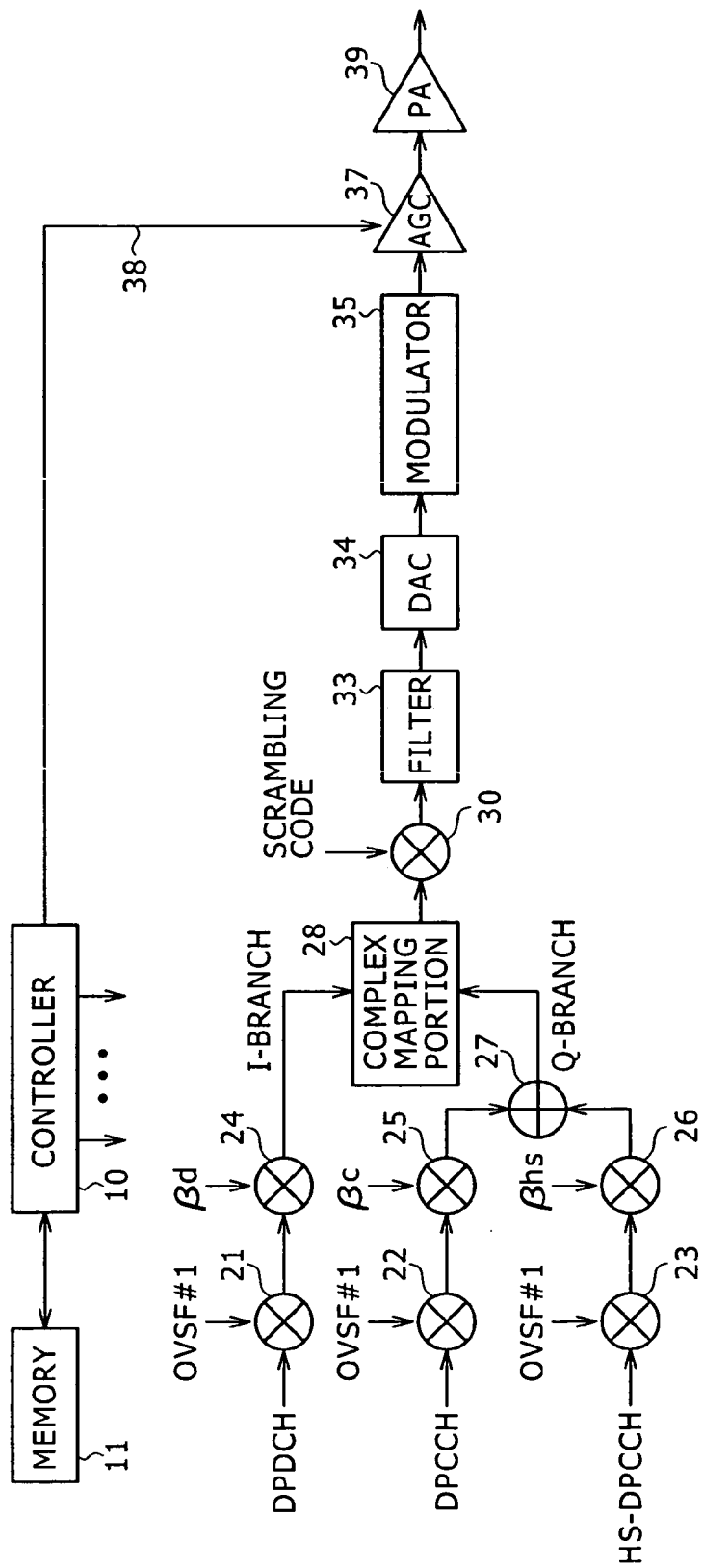
FIG. 1 is a block diagram schematically showing the configuration of an uplink system to implement HSDPA according to an embodiment of the present invention.

FIG. 1 schematically shows the configuration of an uplink system to implement HSDPA according to the embodiment. As already known, the W-CDMA performs spreading by using two types of codes, i.e., a channelization code and a scrambling code. As the channelization code, an OVSF (Orthogonal Variable Spreading Factor) code is used for uplink and downlink. The OVSF code is a set of orthogonal codes and enables multiplexing of multi-symbol rate signals having different spreading factors without interfering with each other. The scrambling code for uplink is a complex code unique to a user.

As shown in FIG. 1, computing units 21, 22, and 23 use the OVSF to spread signals (sequences of real numbers) from the DPDCH, DPCCH, and HS-DPCCH channels, respectively. Computing units 24, 25, and 26 use gain factors (gain parameters) $\beta d$, $\beta c$, and $\beta hs$ to weight the signals. The gain factor is a weighting coefficient equivalent to a transmission electric power ratio. Value $\beta=1.0$ corresponds to a momentarily maximized transmission electric power for a predetermined DPCCH and one or more DPDCHs. The value for $\beta$ is specified (quantized) in 4 bits. An example of each gain factor will be described later.

The signal from the DPDCH is weighted by $\beta d$ to result in an I branch. The signals from the DPCCH and HS-DPCCH are weighted by $\beta c$ and $\beta hs$ and are added in an adder 27 to result in a Q branch. The I branch and the Q branch are processed in a complex mapping portion 28 to result in a sequence of complex numbers. A computing unit 30 uses a scrambling code to re-spread an output from the complex mapping portion 28. A filter 33 limits the output to a specified bandwidth. A digital-analog converter (DAC) 34 converts the output into an analog signal. A modulator 35 provides a specified modulation process (e.g., HPSK: Hybrid Phase Shift Keying). The modulated signal passes through an automatic gain control circuit (AGC) 37, is amplified in a power amplifier (PA) 39, and is wirelessly transmitted via an antenna (not shown). A controller 10 functions as main control means and has a central processing unit (CPU) and a digital signal processor (DSP) for example. The controller 10 controls the system components using a control program and data in memory 11. According to the embodiment, the controller 10 especially controls a control signal 38 to be supplied to the AGC 37 to control the maximum transmission electric power of the power amplifier 39.

The HS-DPCCH is assigned to either an I phase or a Q phase depending on the number of multi-codes of the DPDCH. When one DPDCH is available, the HS-DPCCH is assigned to the Q phase and is code-multiplexed with the DPCCH. Code-multiplexing increases the PAPR and accordingly degrades the ACLR. The amount of degradation largely depends on the above-mentioned gain factors. Using these characteristics, the embodiment decreases the maximum transmission electric power to a minimum based on the gain factors so as to satisfy the 3GPP's ACLR specifications when the HSDPA is applied.

The following describes the gain factors $\beta c$, $\beta d$, and $\beta hs$ and the associated parameter $\Delta hs$. These parameters are related with each other as shown in FIGS. 6 and 7 similarly to the description in the 3GPP's technical specification TS25.213.

The gain factors $\beta c$ and $\beta d$ are supplied from a high-order layer or are computed in a mobile device. At least one of the gain factors $\beta c$ and $\beta d$ causes amplitude 1 at a given time point. Values for the gain factors $\beta c$ and $\beta d$ are not specified individually but are specified as control values each composed of a 4-bit word as indicated at the left column of the table in FIG. 6. As seen from the right column, each control value is assigned a ratio between the gain factors $\beta c$ and $\beta d$. Accordingly, the control value can provide the ratio between the gain factors $\beta c$ and $\beta d$. The value at the right column in the table is smaller than or equal to 1 and denotes the ratio of a smaller gain factor to a larger one (=1.0).

As shown in equation (1), $\Delta hs$ at the right column of the table in FIG. 7 is a value associated with signal $\Delta HS$-DPCCH and is equivalent to the ratio of $\beta hs$ to $\beta c$ ($\beta hs/\beta c$). Value $\Delta hs$ is supplied as a control value at the left column in FIG. 7 from the base station and is obtained as a value (numeric value smaller than or equal to 2) at the right column for the entry corresponding to the control value. The control value at the left column represents a signal supplied to the corresponding mobile station in response to the reception quality information ($\Delta cqi$) transmitted to the base station from the mobile device or the reception determination result ($\Delta ack$ or $\Delta nack$) of the reception data.

$$\beta hs = \beta c \times \Delta hs \qquad \text{Equation (1)}$$
$$= \beta c \times 10^{\frac{\Delta HS-DPCCH}{20}}$$

The information shown in FIGS. 6 and 7 are stored as data tables in the memory of each mobile device in a nonvolatile fashion.

Figure 2:
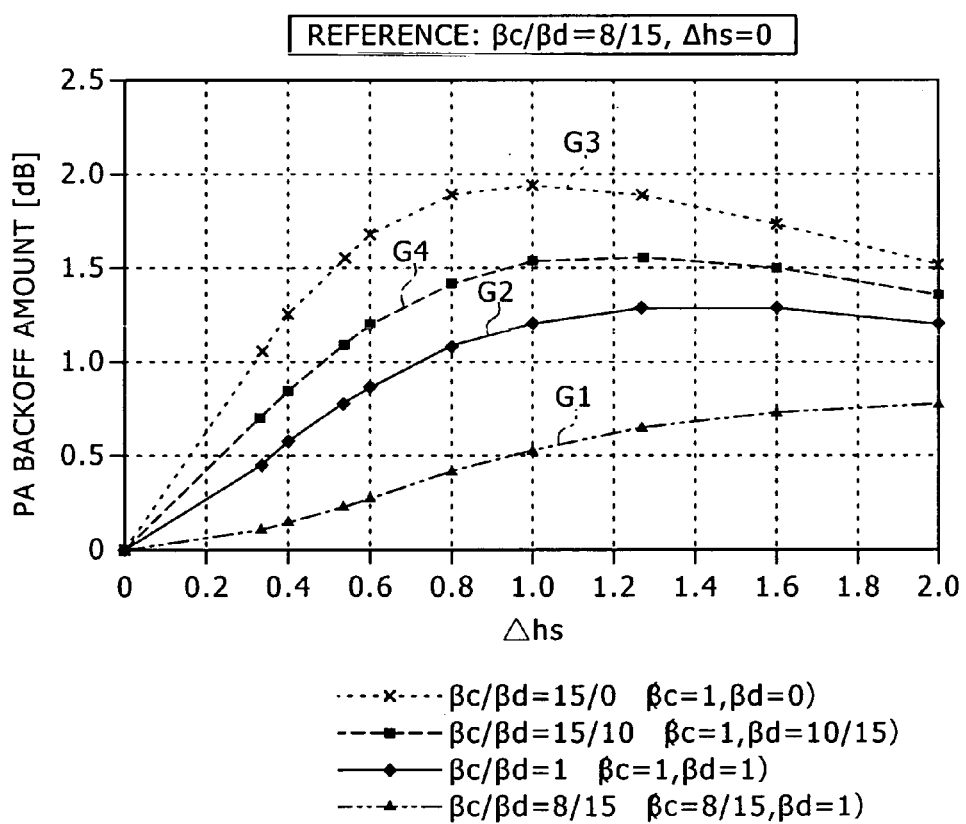
FIG. 2 is a graph showing the relationship between a backoff amount of maximum transmission electric power for a power amplifier, βc, βd, and Δhs needed to satisfy ACLR specifications when HS-DPCCH is added.

FIG. 2 is a graph showing the relationship between a backoff amount of maximum transmission electric power for a power amplifier, values $\beta c$, $\beta d$, and $\Delta hs$ needed to satisfy the ACLR specifications when HS-DPCCH is added. The graph is based on the maximum transmission electric power to satisfy the ACLR specifications when no HS-DPCCH is added. The backoff amount is an actual measurement with reference to the maximum transmission electric power of the power amplifier under the condition of $\beta c/\beta d=8/15$ and $\Delta hs=0$ (i.e., $\beta hs=0$). Four graphs G1 through G4 in FIG. 2 correspond to four cases with different gain factor ratios $\beta c/\beta d$ between the data channel and the control channel. These four cases can be assumed in accordance with the prescription in the above-mentioned 3GPP technical specifications. In this example, the graph G1 represents $\beta c/\beta d=8/15$. The graph G2 represents $\beta c/\beta d=1$. The graph G3 represents $\beta c/\beta d=15/0$. When $\beta c=1$ and $\beta d$ is smaller than 1 ($\beta c/\beta d=15/10$ in this example), it is ascertained that the characteristic takes effect between $\beta c/\beta d=1$ (graph G2) and $\beta c=1$ and $\beta d=0$ (graph G3) as represented by the graph G4. From these graphs, it can be supposed that decreasing $\Delta hs$ or the gain factor $\beta c/\beta d$ generally enables the backoff amount to be small.

Figure 3:
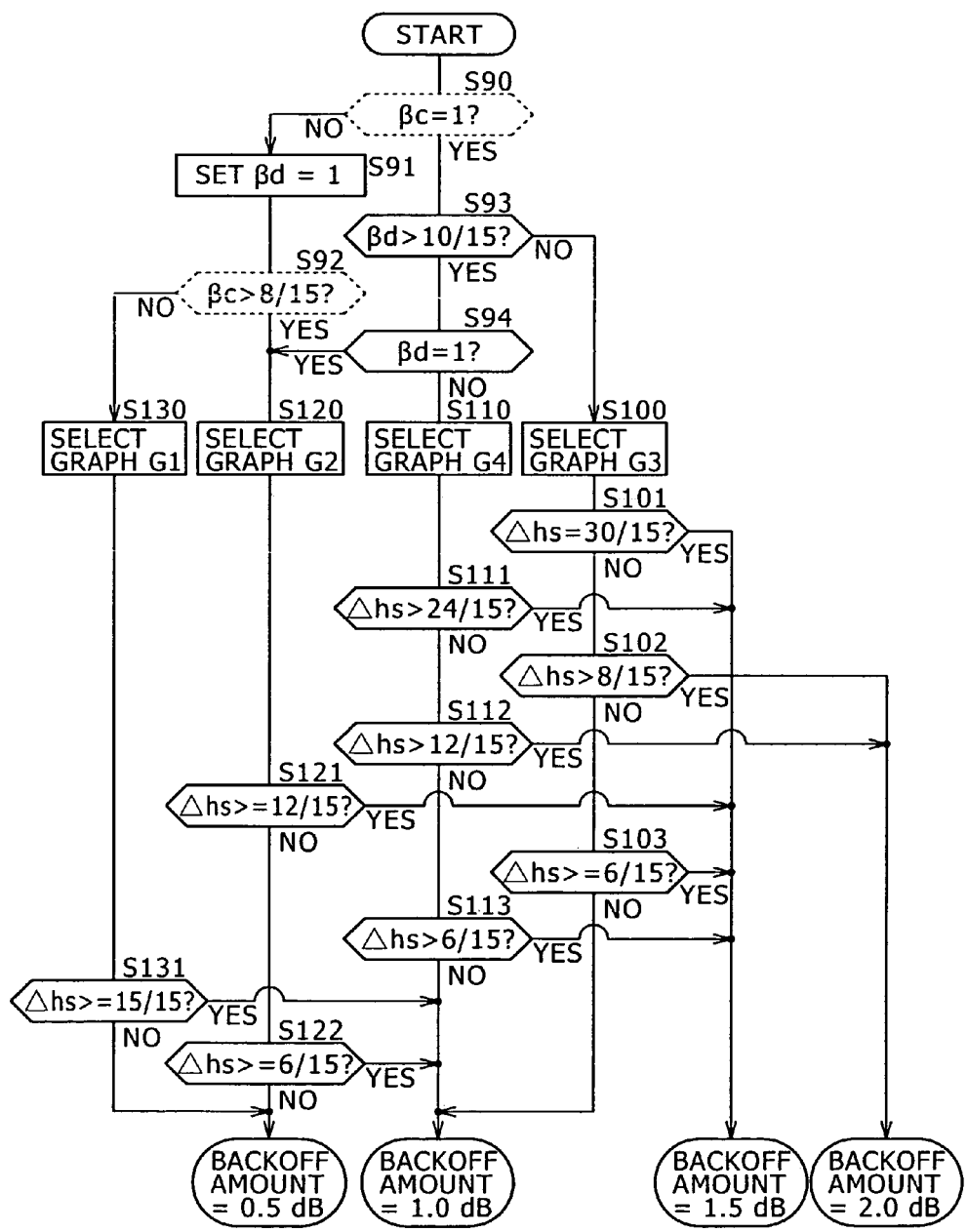
FIG. 3 is a flowchart showing a first process to determine a backoff amount of maximum transmission electric power according to the embodiment of the present invention.

Using the relationship represented by the graphs in FIG. 2, it is possible to determine the backoff amount of maximum transmission electric power during transmission of the HS-DPCCH according to the flowchart as shown in FIG. 3. To perform this process, the controller 10 can execute a control program in the memory. The process determines the backoff amount of maximum transmission electric power when using the four combinations of $\beta c$ and $\beta d$ as mentioned above. The following describes an example of setting the backoff amount of maximum transmission electric power in increments of 0.5 dB.

The process checks whether or not $\beta c=1$ is satisfied (S90). When $\beta c=1$ is satisfied, the process checks the value of $\beta d$ (S93 and S94). When $\beta c=1$ is not satisfied, the process can determine $\beta d=1$ is satisfied (S9.1). In this case, the process further checks the value of $\beta c$ (S92). As the results of checking $\beta c$ and $\beta d$, the corresponding graphs G1, G2, G4, and G3 are selected respectively (S130, S120, S110, and S100).

Checking the value of $\Delta hs$ for each of the graphs makes it possible to determine specified backoff amounts.

Specifically, when the graph G1 ($\beta c/\beta d=8/15$) is selected, it is possible to identify the backoff amount as 1.0 dB or 0.5 dB by determining whether or not $\Delta hs \geq 15/15$.

When the graph G2 is selected, the backoff amount is assumed to be 1.5 dB when $\Delta hs \geq 12/15$. Otherwise, it is possible to identify the backoff amount as 1.0 dB or 0.5 dB by determining whether or not $\Delta hs \geq 6/15$.

When the graph G4 is selected, a variation is relatively large. Accordingly, the determination uses three threshold values for $\Delta hs$, i.e., $24/15$, $12/15$, and $6/15$. That is, when $\Delta hs > 24/15$, the backoff amount is assumed to be 1.5 dB. When $\Delta hs > 12/15$, the backoff amount is assumed to be 2.0 dB. When $\Delta hs > 6/15$, the backoff amount is assumed to be 1.5 dB. Otherwise, the backoff amount is assumed to be 1.0 dB.

When the graph G3 is selected, the determination uses three threshold values for $\Delta hs$, i.e., $30/15$, $8/15$, and $6/15$. That is, when $\Delta hs > 30/15$; the backoff amount is assumed to be 1.5 dB. When $\Delta hs > 8/15$, the backoff amount is assumed to be 2.0 dB. When $\Delta hs \geq 6/15$, the backoff amount is assumed to be 1.5 dB. Otherwise, the backoff amount is assumed to be 1.0 dB.

As mentioned above, it is possible to configure an optimum backoff amount of maximum transmission electric power during HS-DPCCH transmission depending on situations.

Further, there may be a case of fine-tuning the backoff amount of maximum transmission electric power. In such case, it may be preferable to add a branch in increments smaller than 0.5 dB. In addition, it may be preferable to add a branch based on another graph by combining $\beta c$ and $\beta d$.

Figure 4:
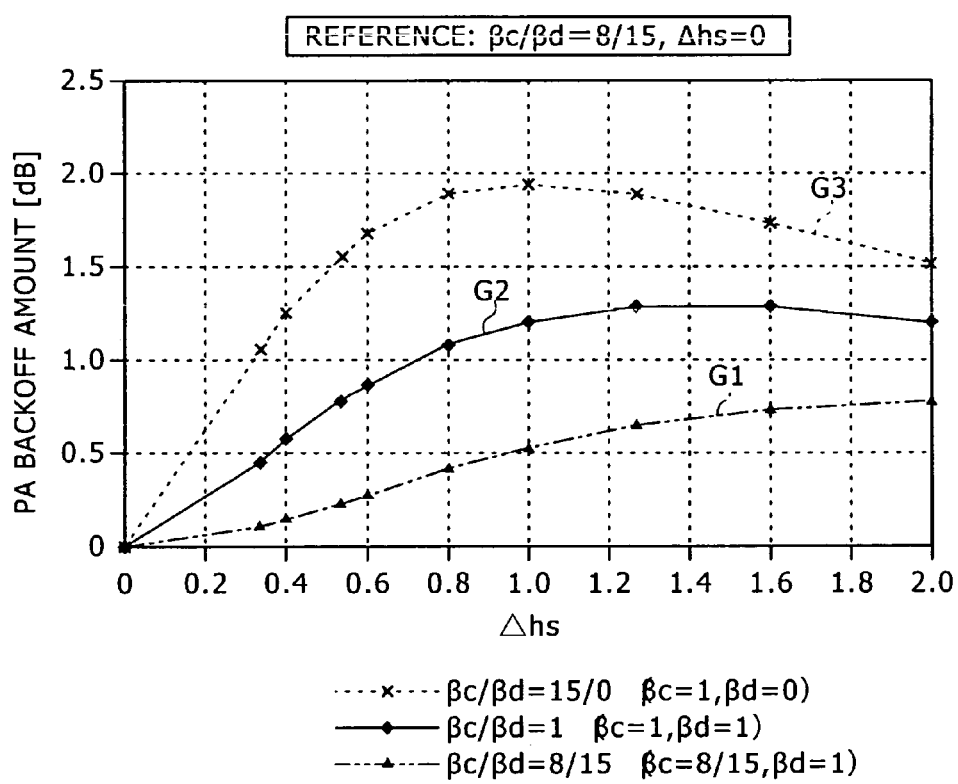
FIG. 4 is another graph showing the relationship between a backoff amount of maximum transmission electric power for the power amplifier, βc, βd, and Δhs needed to satisfy ACLR specifications when HS-DPCCH is added.

Normally, the DPDCH as the data channel uses a smaller spreading factor than the DPCCH as the control channel and consumes a large electric power. Usually, $\beta d$ is set to 1 or 0 (no transmission data) depending on the presence or absence of transmission data. FIG. 4 shows an example of eliminating the graph G4 of $\beta c/\beta d=15/10$ from FIG. 2. Let us consider $\beta d/\beta c=1$ (graph G2) in FIG. 4 to be a reference. When $\beta d$ equals 1 and $\beta c$ is smaller than 1, it is as certained that the characteristic becomes below the level of the graph G2 of $\beta c/\beta d=1$. It can be seen from FIG. 4 that the backoff amount needs to be increased when no transmission data ($\beta d=0$) is available compared to the case where transmission data is available ($\beta d$ set to non-zero) FIG. 5 is a flowchart showing a second process to determine the backoff amount of maximum transmission electric power according to the embodiment of the present invention using the relationship represented by the graphs in FIG. 4.

The embodiment confirms only the presence or absence of transmission data for the DPDCH without directly using the value of $\beta d$. When no transmission data is available, the value of $\beta d$ is assumed to be 0. That is, unlike the case in FIG. 3, the value of $\beta d$ is not confirmed. Similarly to the case in FIG. 3, the backoff amount of maximum transmission electric power is configured in increments of 0.5 dB.

Figure 5:
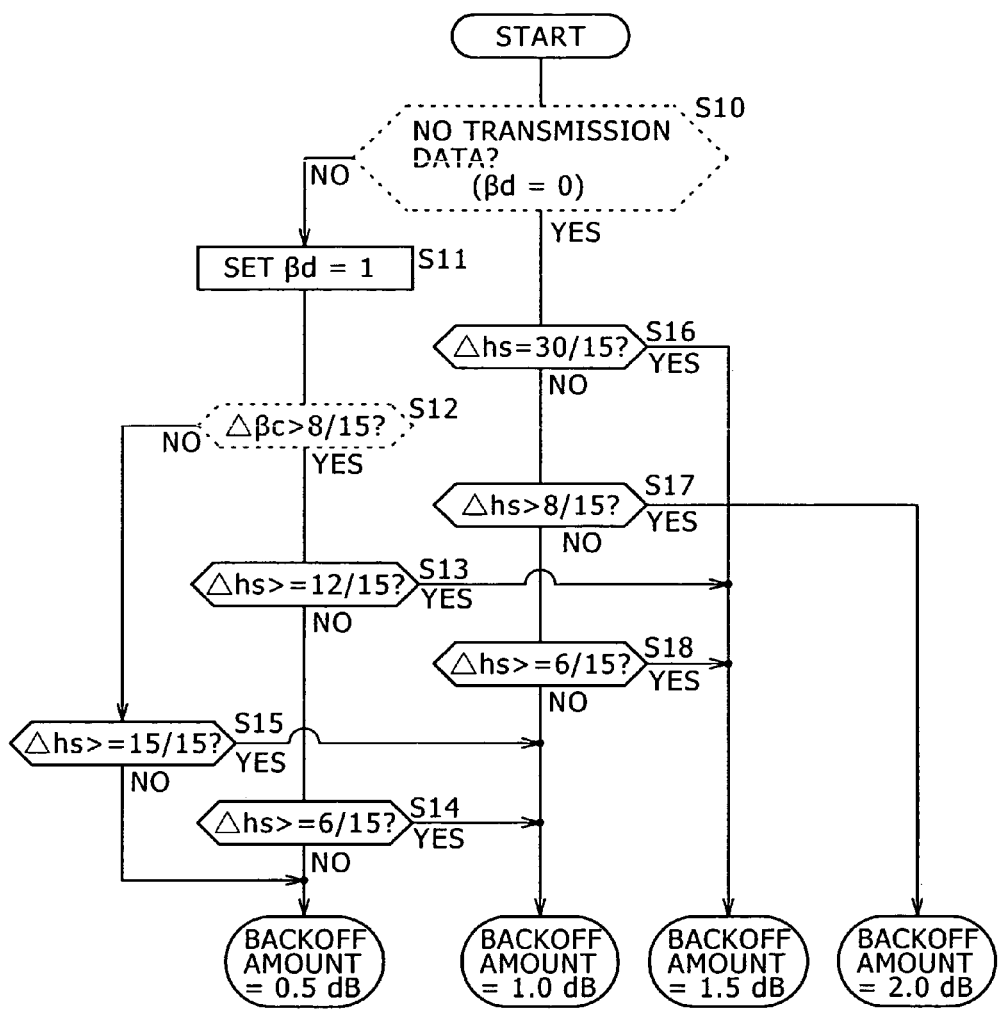
FIG. 5 is a flowchart showing a second process to determine a backoff amount of maximum transmission electric power according to the embodiment of the present invention.

In the flowchart of FIG. 5, the process uses a branch at S10 to check whether or not transmission data is available. Though this step is equivalent to checking whether or not $\beta d$ equals 0, the determination is possible without needing to directly check the value of $\beta d$. When $\beta d$ equals 0, the process assumes $\beta c$ to be 1. At this time, the necessary backoff amount takes effect up to the level of the graph G3 configured to be $\beta c/\beta d=15/0$. When the backoff amount is set in increments of 0.5 dB, the process determines the backoff amounts in accordance with the value of $\Delta hs$ using branches at S16, S17, and S18.

When data is available at Step S10, $\beta d$ is normally set to 1 (S11). The necessary backoff amount takes effect up to the level of the graph G2 configured to be $\beta c/\beta d=1$. Further, it is possible to more finely select the necessary backoff amount by considering the graph G1 configured to be $\beta c/\beta d=8/15$ in FIG. 4. According to the graph G2 configured to be $\beta c/\beta d=1$, the backoff amount needed to satisfy the ACLR changes to 1.5 dB from 1 dB under the condition of $\Delta hs=12/15$. Accordingly, the process branches at S13. Likewise, the backoff amount changes to 1 dB from 0.5 dB under the condition of $\Delta hs=6/15$. Accordingly, the process branches at S14. When $\beta c/\beta d$ is set to 8/15, the backoff amount changes to 1 dB from 0.5 dB under the condition of $\Delta hs=15/15$. Accordingly, the process branches at S15.

As mentioned above, this process example can set the backoff amount of maximum transmission electric power during HS-DPCCH transmission without directly confirming the value of gain factor $\beta d$. Based on the graphs in FIG. 4, it is possible to determine backoff amounts in smaller increments.

Figure 8:
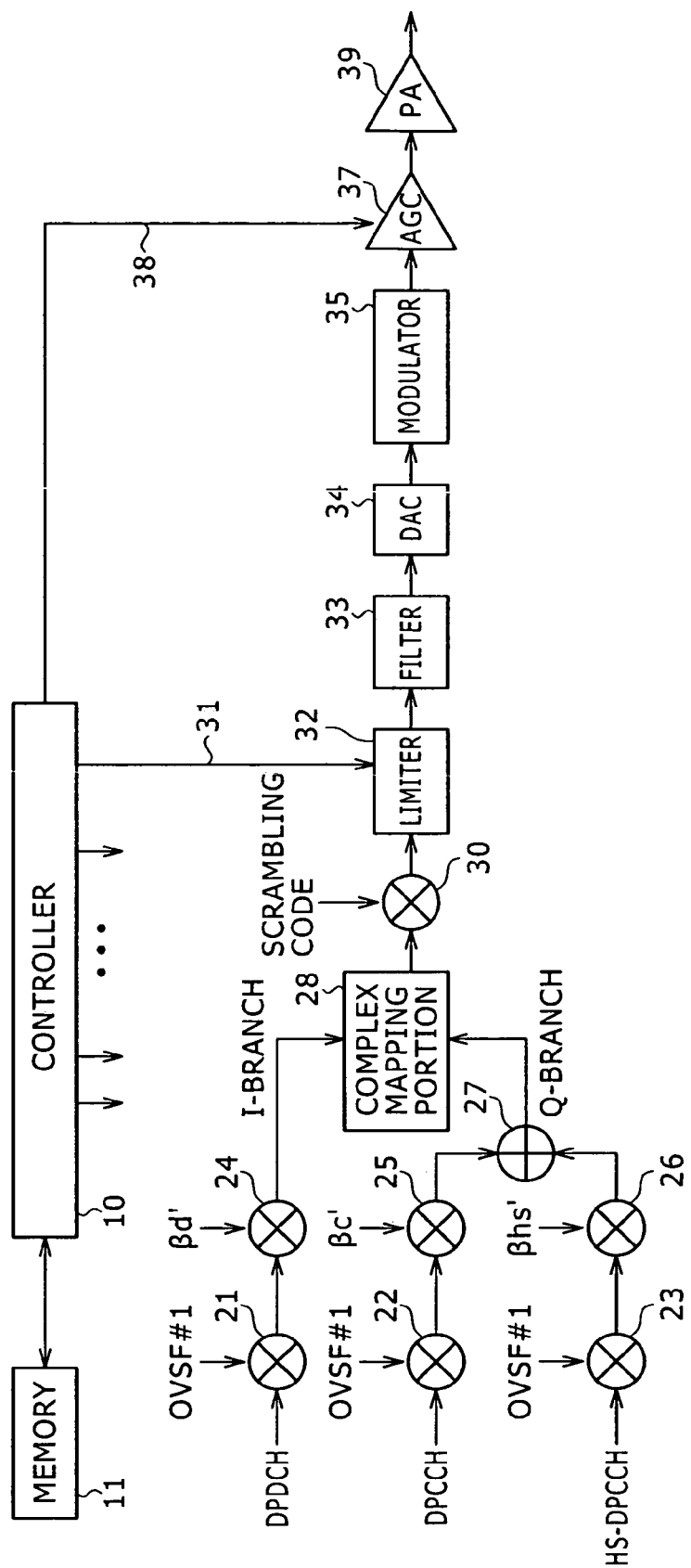
FIG. 8 is a block diagram schematically showing the configuration of an uplink system to implement HSDPA according to a second embodiment of the present invention.

FIG. 8 provides a block diagram schematically showing the configuration of an uplink system to implement the HSDPA according to a second embodiment of the present invention.

This configuration provides a limiter 32 subsequent to the computing unit 30 and previous to the filter 33. The controller 10 controls the limiter 32 via a control signal 31. The other parts of the configuration are the same as those of the first embodiment shown in FIG. 1. The mutually corresponding parts in FIGS. 8 and 1 are designated by the same reference numerals. A duplicate description is omitted for simplicity.

The first embodiment implements the maximum transmission electric power of the power amplifier under AGC control. According to the second embodiment, the limiter 32 clips a transmission signal close to the maximum transmission electric power output using the baseband to decrease the adjacent channel leakage power. That is, the clipping level of the limiter 32 is varied in accordance with the necessary transmission electric power to suppress the peak power, thus preventing the PAPR from increasing and the ACLR from degrading.

More specifically, let us assume that the base station requests a transmission electric power greater than or equal to a given threshold value close to the maximum transmission electric power. In such case, the limiter 32 clips the transmission signal using the base band at a plurality of steps according to the magnitude of the requested transmission electric power. No consideration needs to be given to the ACLR degradation with respect to the transmission electric power smaller than the threshold value. Accordingly, the transmission signal is clipped using the base band for filtering only when the threshold value is exceeded. This suppresses the peak power and prevents the PAPR from increasing and the ACLR from degrading.

According to the first embodiment, the AGC 35 controls power values previous to the AGC 35. No consideration needs to be given to output power levels for the complex mapping portion 28. According to the second embodiment; however, the limiter 32 provides clipping previously to the AGC 37. Therefore, it is desirable to normalize output power values for the complex mapping portion 28.

For this purpose, the configuration example in FIG. 8 respectively converts $\beta d$, $\beta c$, and $\beta hs$ into $\beta d'$, $\beta c'$, and $\beta hs'$ so as to always ensure constant power values for the complexed signal. Specifically, the power output from the complex mapping portion 28 needs to be set to A2. For this purpose, the following equations (2) through (6) are used to respectively convert $\beta d$, $\beta c$, and $\beta hs$ into $\beta d'$, $\beta c'$, and $\beta hs'$ while maintaining ratios of the values βd, βc, and βhs therebetween. The controller 10 can perform this conversion.

Equation (2) expresses the relationship among value A and βd', βc', and βhs'.

$$A=\sqrt{\beta d'^2+\beta c'^2+\beta hs'^2} \quad \text{Equation (2)}$$

Let us suppose that B2 is power after complex mapping of βd, βc, and βhs. Value B is found by equation (3) as follows.

$$B=\sqrt{\beta d^2+\beta c^2+\beta hs^2} \quad \text{Equation (3)}$$

The power after the complex mapping can be converted into A2 (constant) from B2 while maintaining ratios of the values βd, βc, and βhs therebetween. To do this, it just needs to multiply βd, βc, and βhs by A/B and convert them into βd', βc', and βhs' as expressed by equations (4), (5), and (6). The equations round fractions due to the multiplication of A/B ("round" is an operator for rounding).

$$\beta d' = \text{round}\left(\frac{A}{B} \cdot \beta d\right) \quad \text{Equation (4)}$$

$$\beta c' = \text{round}\left(\frac{A}{B} \cdot \beta c\right) \quad \text{Equation (5)}$$

$$\beta hs' = \text{round}\left(\frac{A}{B} \cdot \beta hs\right) \quad \text{Equation (6)}$$

Figure 9:
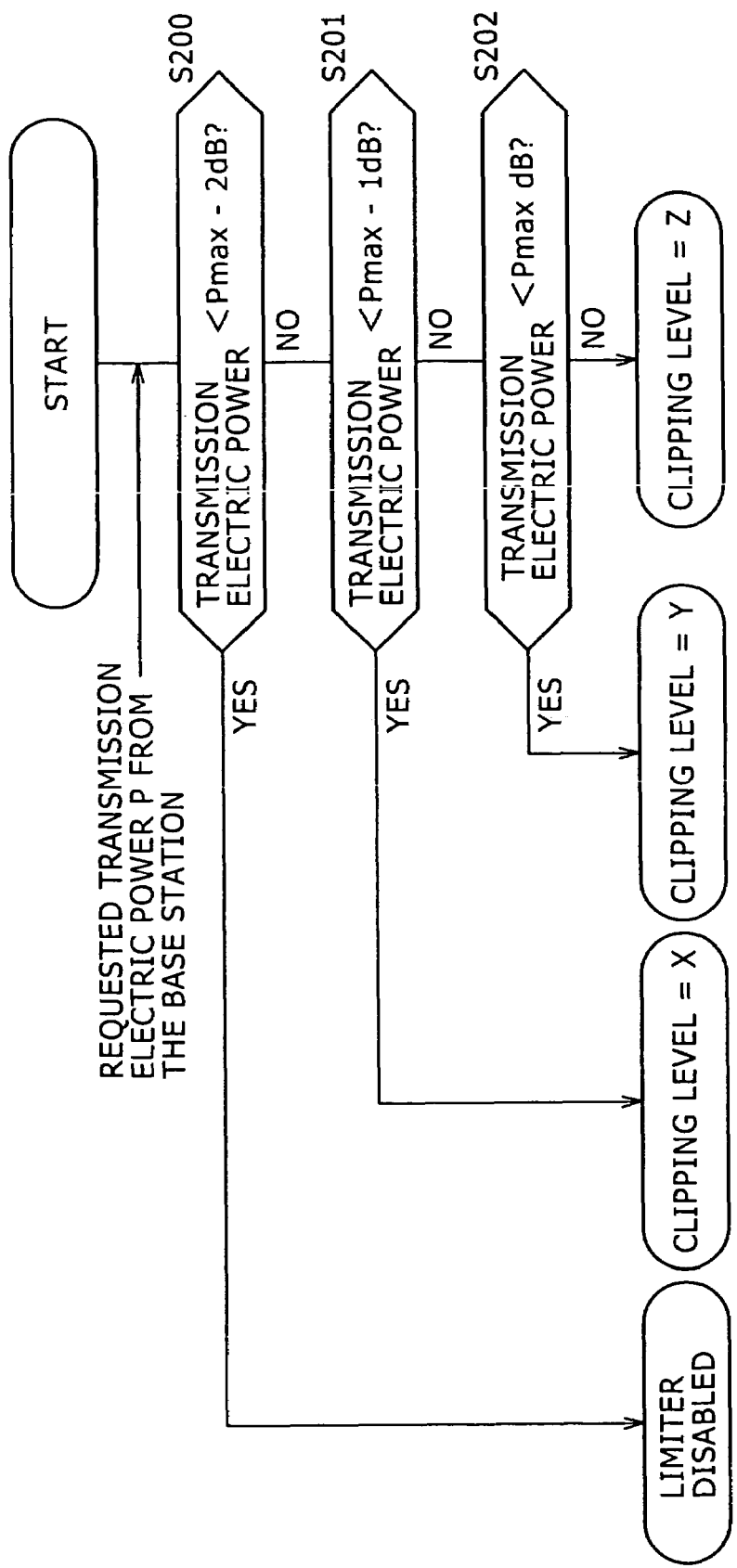
FIG. 9 is a flowchart showing a process flow according to the second embodiment of the present invention.

FIG. 9 shows a process flow according to the second embodiment. This process can be implemented when the controller 10 executes a control program stored in the memory 11. The memory 11 antecedently stores maximum transmission electric power Pmax, i.e., a parameter specific to the mobile device.

The controller 10 provides control to vary the clipping level of the limiter 32 according to a comparison result between transmission electric power P requested from the base station and maximum transmission electric power Pmax. This example uses three threshold values for transmission electric power clipping, i.e., Pmax, Pmax-1 dB, and Pmax-2 dB. Clipping levels are set to X, Y, and Z (X<Y<Z).

The controller 10 receives requested transmission electric power P from the base station and then compares the P value with the threshold value to determine the clipping level. At S200, when the requested transmission electric power P from the base station is smaller than Pmax-2 dB, the process disables the limiter 32. That is, no clipping is performed.

When the requested transmission electric power P is greater than or equal to Pmax-2 dB and is determined to be smaller than Pmax-1 dB at S201, the process sets the clipping level to X.

When the requested transmission electric power P is greater than or equal to Pmax-1 dB and is determined to be smaller than Pmax dB at S202, the process sets the clipping level to Y. When the requested transmission electric power P is Pmax, the process sets the clipping level to Z.

The above-mentioned control can suppress the peak power and prevent the PAPR from increasing and the ACLR from degrading. This embodiment eliminates the need to check values of the gain factors βd, βc, and βhs to determine the clipping level.

While there have been described the preferred embodiments of the present invention, it is to be distinctly understood that various changes and modifications may be made in the present invention. For example, the embodiments use specific values such as the gain factors βd, βc, and βhs, and Ahs or dB values. These are only examples for the description. The present invention is not limited thereto. The present invention has exemplifies implementation of the HSDPA in the W-CDMA system. Further, the present invention can be used to implement any function in any system that confronts the same problem as the present invention.

The invention claimed is:

1. A transmission electric power control method of controlling a maximum transmission electric power during transmission of a plurality of signals in a code-multiplexing fashion,
    wherein, when code multiplexing is used to transmit signals from a first transmission channel to transmit data, a second transmission channel to transmit main control information, and a third transmission channel to transmit additional control information and when first, second, and third gain factors are used to weight signals from said first, second, and third transmission channels, a maximum transmission electric power is decreased at a plurality of levels based on a ratio between said first and second gain factors and a ratio between said second and third gain factors.

2. The transmission electric power control method according to claim 1,
    wherein the backoff amount of maximum transmission electric power is decreased as a ratio of said second gain factor to said first gain factor decreases.

3. The transmission electric power control method according to claim 1,
    wherein the backoff amount of maximum transmission electric power is decreased as a ratio of said third gain factor to said second gain factor decreases.

4. The transmission electric power control method according to claim 1,
    wherein said maximum transmission electric power is decreased under control of an automatic gain control circuit disposed previously to a power amplifier.

5. The transmission electric power control method according to claim 1,
    wherein said transmission electric power control method is used for a mobile device and said additional control information is equivalent to mobile device's reception quality information transmitted to a base station by a mobile device so as to improve a data transmission rate from a base station to a mobile device and/or a reception determination result of received data.

6. A transmission electric power control method of controlling a maximum transmission electric power during transmission of a plurality of signals in a code-multiplexing fashion,
    wherein code multiplexing is used to transmit signals from a first transmission channel to transmit data, a second transmission channel to transmit main control information, and a third transmission channel to transmit additional control information, said method comprising the steps of:
    checking whether or not transmission data is available;
    when no transmission data is available, using first, second, and third gain factors to weight signals from said first, second, and third transmission channels and decreasing a maximum transmission electric power at a plurality of levels based on a ratio between said second and third gain factors; and
    when transmission data is available, decreasing a maximum transmission electric power at a plurality of levels based on said second gain factor and a ratio between said second and third gain factors.

7. The transmission electric power control method according to claim 6,
wherein a backoff amount for unavailability of transmission data is configured to be larger than that for availability of transmission data.

8. The transmission electric power control method according to claim 6,
wherein a backoff amount of maximum transmission electric power is decreased as a ratio of said third gain factor to said second gain factor decreases.

9. The transmission electric power control method according to claim 4,
wherein said maximum transmission electric power is decreased under control of an automatic gain control circuit disposed previously to a power amplifier.

10. The transmission electric power control method according to claim 6,
wherein said transmission electric power control method is used for a mobile device and said additional control information is equivalent to mobile device's reception quality information transmitted to a base station by a mobile device so as to improve a data transmission rate from a base station to a mobile device and/or a reception determination result of received data.

11. A transmission electric power control apparatus for controlling a maximum transmission electric power during transmission of a plurality of signals in a code-multiplexing fashion, said apparatus comprising:
first spreading means for providing a first spreading process to signals from a first transmission channel to transmit data, a second transmission channel to transmit main control information, and a third transmission channel to transmit additional control information;
weighting means for weighting signals from said first, second, and third transmission channels after said first spreading process with first, second, and third gain factors, respectively;
complex mapping means for complex-mapping said weighted signals from channels;
second spreading means for providing a second spreading process to output from said complex mapping means;
a filter for limiting a band for output from said second spreading means;
digital-analog conversion means for converting output from said filter into an analog signal;
modulation means for providing a specified modulation process to output from said digital-analog conversion means;
automatic gain control means for controlling an amplification gain with respect to output from said modulation means;
electric power amplification means for electrically amplifying output from said automatic gain control means; and
main control means for using when first, second, and third gain factors to weight signals from said first, second, and third transmission channels and decreasing a maximum transmission electric power at a plurality of levels based on a ratio between said first and second gain factors and a ratio between said second and third gain factors.

12. The transmission electric power control apparatus according to claim 11,
wherein said main control means controls said automatic gain control means to decrease said maximum transmission electric power.

13. A transmission electric power control apparatus for controlling a maximum transmission electric power during transmission of a plurality of signals in a code-multiplexing fashion, said apparatus comprising:
first spreading means for providing a first spreading process to signals from a first transmission channel to transmit data, a second transmission channel to transmit main control information, and a third transmission channel to transmit additional control information;
weighting means for weighting signals from said first, second, and third transmission channels after said first spreading process with first, second, and third gain factors, respectively;
complex mapping means for complex-mapping said weighted signals from channels;
second spreading means for providing a second spreading process to output from said complex mapping means;
a filter for limiting a band for output from said second spreading means;
digital-analog conversion means for converting output from said filter into an analog signal;
modulation means for providing a specified modulation process to output from said digital-analog conversion means;
automatic gain control means for controlling an amplification gain with respect to output from said modulation means;
electric power amplification means for electrically amplifying output from said automatic gain control means; and
main control means for checking availability of transmission data for transmission of signals from said first, second, and third transmission channels, decreasing a maximum transmission electric power at a plurality of levels based on a ratio between said second and third gain factors when no transmission data is available, and decreasing a maximum transmission electric power at a plurality of levels based on said second gain factor and a ratio between said second and third gain factors when transmission data is available.

* * * * *